United States Patent
Sherman

(10) Patent No.: US 11,583,806 B2
(45) Date of Patent: Feb. 21, 2023

(54) VARIABLE DRAIN FLOW RESTRICTOR

(71) Applicant: Ecowater Systems LLC, Woodbury, MN (US)

(72) Inventor: Michael J. Sherman, Woodbury, MN (US)

(73) Assignee: Ecowater Systems LLC, Woodbury, MN (US)

( * ) Notice: Subject to any disclaimer, the term of this patent is extended or adjusted under 35 U.S.C. 154(b) by 172 days.

(21) Appl. No.: 17/101,544

(22) Filed: Nov. 23, 2020

(65) Prior Publication Data

US 2021/0069644 A1 Mar. 11, 2021

Related U.S. Application Data

(60) Division of application No. 16/400,437, filed on May 1, 2019, now Pat. No. 10,874,987, which is a
(Continued)

(51) Int. Cl.
*F16K 31/50* (2006.01)
*G05D 16/10* (2006.01)
(Continued)

(52) U.S. Cl.
CPC ............. *B01D 61/12* (2013.01); *B01D 61/10* (2013.01); *C02F 1/008* (2013.01); *C02F 1/441* (2013.01);
(Continued)

(58) Field of Classification Search
CPC ............... F16K 31/508; Y10T 137/776; Y10T 137/2574; Y10T 137/2605; B01D 61/02; B01D 61/025; B01D 61/12; G05D 16/10
See application file for complete search history.

(56) References Cited

U.S. PATENT DOCUMENTS

| 1,343,694 A | 6/1920 | Turner |
| 2,195,244 A | 3/1940 | Ericson |

(Continued)

FOREIGN PATENT DOCUMENTS

| AU | 600790 | 8/1980 |
| CN | 2210985 | 10/1995 |

(Continued)

OTHER PUBLICATIONS

Slovak, Robert, Water on-Water RO, The Long Awaited Next Step, Water Conditioning & Purification, Jul. 2006, pp. 38-43.
(Continued)

*Primary Examiner* — Paul J Gray
(74) *Attorney, Agent, or Firm* — Delio Peterson & Curcio LLC; Robert Curcio

(57) ABSTRACT

A proportioning valve for a reverse osmosis system that controls the production of product water by the differential pressure across the purification membrane. By sensing increasing tank pressure to actuate the proportioning valve, the flow of waste water is restricted. Placement of seals within the cavity of the valve, as well as placement of waste water inlet and outlet ports, protects tension components that provide reverse tank pressure from waste water exposure. A needle valve assembly responsive to an actuating assembly that senses tank pressure removes the need for an inlet tank water port while restricting water flow.

12 Claims, 9 Drawing Sheets

Related U.S. Application Data continuation of application No. 14/814,857, filed on Jul. 31, 2015, now Pat. No. 10,456,748.

(51) Int. Cl.

| | | |
|---|---|---|
| *B01D 61/12* | (2006.01) | |
| *C02F 1/44* | (2023.01) | |
| *G05D 16/00* | (2006.01) | |
| *B01D 61/10* | (2006.01) | |
| *C02F 1/00* | (2023.01) | |
| *F16K 1/04* | (2006.01) | |
| *F16K 1/38* | (2006.01) | |
| *F16K 3/24* | (2006.01) | |
| *F16K 3/26* | (2006.01) | |
| *F16K 3/314* | (2006.01) | |
| *F16K 3/34* | (2006.01) | |
| *F16K 31/122* | (2006.01) | |
| *F16K 31/53* | (2006.01) | |
| *F16K 37/00* | (2006.01) | |
| *B01D 61/02* | (2006.01) | |

(52) U.S. Cl.
CPC ............... *F16K 1/04* (2013.01); *F16K 1/385* (2013.01); *F16K 3/24* (2013.01); *F16K 3/26* (2013.01); *F16K 3/314* (2013.01); *F16K 3/34* (2013.01); *F16K 31/1221* (2013.01); *F16K 31/508* (2013.01); *F16K 31/53* (2013.01); *F16K 37/005* (2013.01); *G05D 16/028* (2019.01); *G05D 16/103* (2013.01); *B01D 61/025* (2013.01); *B01D 2313/18* (2013.01); *C02F 2201/005* (2013.01); *C02F 2209/03* (2013.01); *C02F 2209/05* (2013.01); *C02F 2209/40* (2013.01); *C02F 2209/42* (2013.01)

(56) References Cited

U.S. PATENT DOCUMENTS

| | | | |
|---|---|---|---|
| 3,077,989 A | 2/1963 | Larkin | |
| 3,101,187 A | 8/1963 | Campbell | |
| 3,315,696 A | 4/1967 | Hunter | |
| 3,493,496 A | 2/1970 | Bray et al. | |
| 3,568,843 A | 3/1971 | Brown | |
| 3,616,921 A | 11/1971 | Bray | |
| 3,939,074 A | 2/1976 | Bray | |
| 3,959,146 A | 5/1976 | Bray | |
| 3,966,616 A | 6/1976 | Bray | |
| 4,021,351 A | 5/1977 | Bray | |
| 4,108,134 A | 8/1978 | Malee | |
| 4,156,645 A | 5/1979 | Bray | |
| 4,190,537 A | 2/1980 | Tondreau et al. | |
| 4,230,579 A | 10/1980 | Bray et al. | |
| 4,506,518 A | 3/1985 | Yoshikawa et al. | |
| 4,512,370 A | 4/1985 | Roger | |
| 4,548,714 A | 10/1985 | Kirwan, Jr. et al. | |
| 4,565,219 A | 1/1986 | Kunogi | |
| 4,623,451 A | 11/1986 | Oliver | |
| 4,657,674 A | 4/1987 | Burrows | |
| 4,711,723 A | 12/1987 | Bray | |
| 4,713,175 A | 12/1987 | Bray | |
| 4,756,835 A | 7/1988 | Wilson | |
| 4,784,771 A | 11/1988 | Wathen et al. | |
| 4,828,708 A | 5/1989 | Bray | |
| 4,842,724 A | 6/1989 | Bray et al. | |
| 4,842,736 A | 6/1989 | Bray et al. | |
| 4,885,081 A | 12/1989 | Oliver | |
| 4,906,372 A | 3/1990 | Hopkins | |
| 5,076,321 A | 12/1991 | Terry | |
| 5,096,574 A | 3/1992 | Birdsong et al. | |
| 5,228,473 A | 7/1993 | Zink | |
| 5,296,148 A | 3/1994 | Colangelo et al. | |
| 5,778,679 A | 7/1998 | Celorier, Jr. et al. | |
| 6,190,558 B1 | 2/2001 | Robbins | |
| 6,250,602 B1 * | 6/2001 | Jansen | F02K 9/58 251/903 |
| 6,575,308 B1 | 6/2003 | Oyama et al. | |
| 6,802,487 B2 | 10/2004 | Heun et al. | |
| 8,083,936 B1 | 12/2011 | Walker | |
| 2004/0007013 A1 | 1/2004 | Takeuchi | |
| 2004/0089355 A1 | 5/2004 | Nirasawa et al. | |
| 2005/0063846 A1 | 3/2005 | Maeda | |
| 2008/0031754 A1 | 2/2008 | Harada et al. | |
| 2010/0270217 A1 | 10/2010 | Burrows | |
| 2011/0068284 A1 | 3/2011 | Jorgensen | |
| 2012/0248362 A1 | 10/2012 | Williamson | |
| 2013/0056660 A1 | 3/2013 | Roby | |

FOREIGN PATENT DOCUMENTS

| | | |
|---|---|---|
| CN | 103791098 | 5/2014 |
| GB | 2390141 | 12/2003 |
| JP | 2009092093 | 4/2009 |

OTHER PUBLICATIONS

Kershner, Kate. "How Reverse Osmosis Works" May 8, 2008. HowStuffWorks.com. <http://science.howstuffworks.com/reverse-osmosis.htm> Aug. 10, 2015.

Reverse Osmosis, pp. 1-5, en.wikipedia.org/wiki/Reverse_Osmosis, Jul. 1, 2008.

Home Water Treatment Systems, Reverse Osmosis Filtration, p. 7, engr.uga.edu/service/extension/publications/c819-10c, Jul. 10, 2008.

* cited by examiner

VARIABLE DRAIN FLOW RESTRICTOR

BACKGROUND OF THE INVENTION

1. Field of the Invention

The invention relates to reverse osmosis (RO) residential/commercial drinking water systems, and more specifically to an apparatus and method for reducing the generation of waste water outlet in an RO system.

2. Description of Related Art

Osmosis is a naturally occurring phenomenon and one of the most important processes in nature. It is a process where a weaker saline solution will tend to migrate to a strong saline solution; that is, a solution that is less concentrated will have a natural tendency to migrate to a solution with a higher concentration. Reverse osmosis occurs when the solution is moved across a membrane against the concentration gradient, from lower concentration to higher concentration. For example, under normal osmosis, a semipermeable membrane with fresh water on one side and a concentrated aqueous solution on the other side would have the fresh water cross the membrane to dilute the concentrated solution. In reverse osmosis, pressure is exerted on the side with the concentrated solution to force the water molecules across the membrane to the lower concentration side.

Reverse osmosis is utilized as a water purification technology employing a semipermeable membrane to remove larger particles from drinking water. A semipermeable membrane is a membrane that will allow some atoms or molecules to pass but not others. Reverse osmosis can remove many types of molecules and ions from solutions, including bacteria, and is used in both industrial processes and the production of potable water. The predominant removal mechanism in membrane filtration is straining, or size exclusion.

The desalinated water that is demineralized or deionized is typically called permeate (or product) water. In a one stage RO system, the feed water enters the RO system as one stream and exits the RO as concentrate and permeate water. The water stream that carries the concentrated contaminants that did not pass through the RO membrane is called the waste (reject or brine) stream.

Generally, in an RO system, water containing impurities enters the system where the impurities are stopped and rejected at the membrane surface. Water pressure then forces water molecules through the membrane. The purified water is then sent directly to the faucet. Impurities are then expelled from the system and sent to a drain underneath the sink area.

As a consequence of an RO system, a portion of the water supply must be used to flush the contaminants to drain. Thus, there is a usage (waste) factor that can represent a significant portion of the total water use.

In U.S. Pat. No. 8,083,936 issued to Walker on Dec. 27, 2011 titled "REDUCING WASTE WATER IN REVERSE OSMOSIS RESIDENTIAL DRINKING WATER SYSTEMS," an RO system is taught where the production of product water is controlled by differential pressure across the purification membrane. As the tank pressure increases, the differential pressure decreases, and a reduced production of product water results. The increasing tank pressure is utilized as a force to actuate a valve that proportions the waste water (a proportioning valve) generally in a relationship to the product water. In this manner, the ratio between the product water and the waste water remains constant during the period that the purified water is being delivered to the holding tank.

FIG. 1 depicts a proportioning valve of the prior art. In this technology, proportioning valve 10 is inserted within an RO system. In the RO system, as pressure is increased in the system's storage tank, pressure tank water enters inlet 12. A piston 14 in the proportioning valve is forced through an O-ring 15 located within a piston housing 16, relocating the piston's position relative (and proportional to) a channel 18 in the piston, which is V-shaped, along and inside the surface portion of the piston. This V-shaped channel 18 slowly decreases in depth as it moves towards seal 13 on the piston. The channel being widest and deepest at the end proximate the ingress port 22. This allows the system to shut off when the tank pressure reaches approximately two-thirds of the line pressure, designed because of diminishing returns of product water in relation to waste water. A return spring 19 resides at the passage or channel end of the piston in a housing 20. Reject water enters the proportioning valve through ingress port 22 in piston housing 16. Reject water exits the proportioning valve through egress port 24 of housing 20 depending upon the positioning of piston 14. Waste water passes through V-shaped channel 18 and the passage surrounded by O-ring 15, and is discharged through egress port 24.

One of the deficiencies with the prior art design is that water enters the spring chamber where it can rust and degrade the life of the spring. Another deficiency is the inability to adjust the proportioning valve to accommodate the particular RO system in which it operates. A third deficiency is the application of numerous mechanical components that tend to degrade and/or fail over time.

SUMMARY OF THE INVENTION

Bearing in mind the problems and deficiencies of the prior art, it is therefore an objective of the present invention to provide a proportioning valve for an RO system capable of protecting its internal workings from contamination due to exposure to reject water.

It is another objective of the present invention to provide a proportioning valve for an RO system that can compensate for variations in different RO systems, as well as the degradation of the reverse-pressure producing mechanism(s) within it.

The above and other objects, which will be apparent to those skilled in the art, are achieved in the present invention which is directed to a proportioning valve for a reverse osmosis system comprising: a cylindrical housing having an internal cavity with a product water inlet proximate one end of the housing; a reject water inlet downstream of the product water inlet but not in fluid communication with the product water inlet; a reject water outlet downstream of, and at times in fluid communication with, the reject water inlet; a slider within the housing responsive on a first end to pressure provided by the product water inlet and on a second end responsive to pressure provided by a reverse pressure mechanism designed to partially counter the pressure provided by the product water, the slider having a channel exposed to the reject water inlet, the channel slidably exposed to the reject water outlet when the slider moves and the channel is placed in fluid communication with the reject water outlet; and at least one seal to keep reject water from entering a portion of the internal cavity that houses the reverse pressure mechanism.

The channel is V-shaped, semi-circular, square, a flat incline, or other shape having varying width and/or depth and/or length extending axially along a portion of the slider. The slider may accommodate a plurality of channels.

The reverse pressure mechanism may include a spring in mechanical communication with the slider at one end, and located within the internal cavity second portion.

The internal cavity second portion may include a tension adjustment assembly to set tension of the spring. The tension adjustment assembly may be in the form of an adjustable set screw in rotational communication at one end with the spring, and having a knob for effecting rotation at an opposite end.

The slider may also include a slider extension adjacent to or integral with the slider, the slider extension in mechanical communication with the reverse pressure mechanism.

In a second aspect, the present invention is directed to a proportioning valve for regulating fluid flow in a system having set line fluid pressure, the valve comprising: a housing having an internal cavity, a first fluid ingress port, a second fluid ingress port, and a fluid egress port, a first portion of the internal cavity adapted to house a sliding mechanism, and a second portion of the internal cavity adapted to house a reverse pressure mechanism; the first fluid ingress port in fluid communication with an external fluid reservoir having an input fluid pressure; the sliding mechanism comprising: a slider or piston in fluid communication at an end face proximate and exposed to the first fluid ingress port such that the slider is slidably responsive to the input fluid pressure; a first seal located circumferentially about the slider prohibiting fluid flow from the first fluid ingress port past the seal towards the second portion of the housing, thereby maintaining the input fluid pressure on the slider; a channel extending axially along a portion of the slider at an end of the slider proximate the second portion of the internal cavity, the channel directing fluid from the second fluid ingress port into the internal cavity and towards the second fluid egress port; a slider extension in mechanical communication with, attached to, or integral with, the slider, located at the end of the slider proximate the second portion of the housing; a second seal in slidable communication with the slider extension, the second seal positioned to ensure fluid from the first fluid ingress port to the fluid egress port does not enter the internal cavity second portion and expose the reverse pressure mechanism to fluid; and an air vent located within the internal cavity second portion to release air pressure when the slide moves in a direction towards the internal cavity second portion; wherein the proportioning valve stops fluid flow from the fluid egress port when the input fluid pressure reaches a predetermined limit of the set line fluid pressure.

In a third aspect, the present invention is directed to a proportioning valve for a reverse osmosis system comprising: a housing having an internal cavity with a reject water inlet proximate one end of the housing; a reject water outlet downstream of the reject water inlet; a needle valve assembly for restricting flow of water from the reject water inlet to the reject water outlet, the needle valve assembly responsive to a sensor.

The needle valve assembly may include a spindle having a shaped end portion at one end, the spindle in communication with an actuating assembly, wherein the actuating assembly is responsive to the sensor such that movement of the actuating assembly causes axial or radial translation of the spindle and the shaped end portion of the spindle to form an orifice with a complementary shaped portion of the internal housing or a complementary shaped component within the internal housing to restrict water flow when the spindle is axially or radially translated, moving the spindle toward the complementary housing or the shaped component.

The spindle shaped end portion is preferably cone-shaped, and the complementary shaped portion of the internal housing is cone-shaped, or the complementary shaped component is cone-shaped.

The needle valve assembly may include: a spindle having a shaped end portion at one end and a threaded portion at the opposite end, the shaped end portion of the spindle forming an orifice with a complementary shaped portion of the internal housing or a complementary shaped component within the internal housing; and a spindle drive in rotational communication with the spindle, the spindle being threadably inserted within a complementary threaded cavity of the spindle drive, such that when the spindle drive is rotated, the threaded cavity of the spindle drive engages the threaded portion of the spindle, which drives the spindle either axially away from, or towards the complementary housing or the complementary shaped component, to restrict water flow when the spindle is moved toward the complementary housing or the complementary shaped component.

Additionally, a motorized assembly may be utilized in conjunction with the proportioning valve, the motorized assembly being responsive to the sensor such that engagement of the motorized assembly with the spindle drive causes axial translation of the spindle such that the shaped end portion of the spindle forms an orifice with the complementary shaped portion of the internal housing or the complementary shaped component within the internal housing.

The spindle may include a flange having at least one slot or groove, and the housing internal cavity having at least one complementary axial projection for receiving the at least one slot or groove to prohibit the spindle from rotating when the spindle is engaged by the actuating assembly.

A seal may be situated proximate a junction of the spindle drive and the spindle, the seal assists in keeping reject water from entering the spindle drive side of the proportioning valve.

The proportioning valve may further include an end cap for securing the spindle drive within the housing, the end cap having an aperture for receiving a shaped end protrusion of the spindle drive adjacent end, the protrusion exiting the housing and the end cap, and slidably engaged with a mechanized worm wheel, such that when the worm wheel is rotated at a rotation that is responsive to a particular tank pressure, the spindle drive rotates and axially displaces the spindle.

Alternatively, the proportioning valve may include a needle valve assembly that comprises a spindle having a shaped end portion at one end and a threaded portion at the opposite end, the spindle in communication with an actuating assembly, wherein the actuating assembly includes an electrical impulse driven motorized assembly or a non-electrical drive-driven gear assembly, and is responsive to the sensor, the sensor sensing tank water pressure, water level in a pressurized or unpressurized storage tank, conductivity, or flow rate of the reject water, or any combination thereof, such that movement of the actuating assembly causes axial or radial translation of the spindle which moves the shaped end portion of the spindle towards a complementary shaped portion of the internal housing or a complementary shaped component within the internal housing to form a restricting orifice that restricts water flow.

The sensor senses tank water pressure, water level in a pressurized or unpressurized storage tank, conductivity, or flow rate of the reject water, or any combination thereof, in the reverse osmosis system.

The spindle may include a threaded portion opposite the shaped end portion, the threaded portion in rotational communication with an actuating assembly, wherein the actuating assembly is responsive to the sensor such that movement of the actuating assembly causes axial and/or radial translation of the spindle and the shaped end portion of the spindle to form an orifice with a complementary shaped portion of the internal housing or a complementary shaped component within the internal housing to restrict water flow when the spindle is axially and/or radially translated, moving the spindle toward the complementary housing or the shaped component.

In each embodiment, the proportioning valve is configured to be added to a residential reverse osmosis drinking water system that modulates the waste water flow in proportion to the product water flow based on input from the sensor.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-12 of the drawings in which like numerals refer to like features of the invention.

Figure 1:
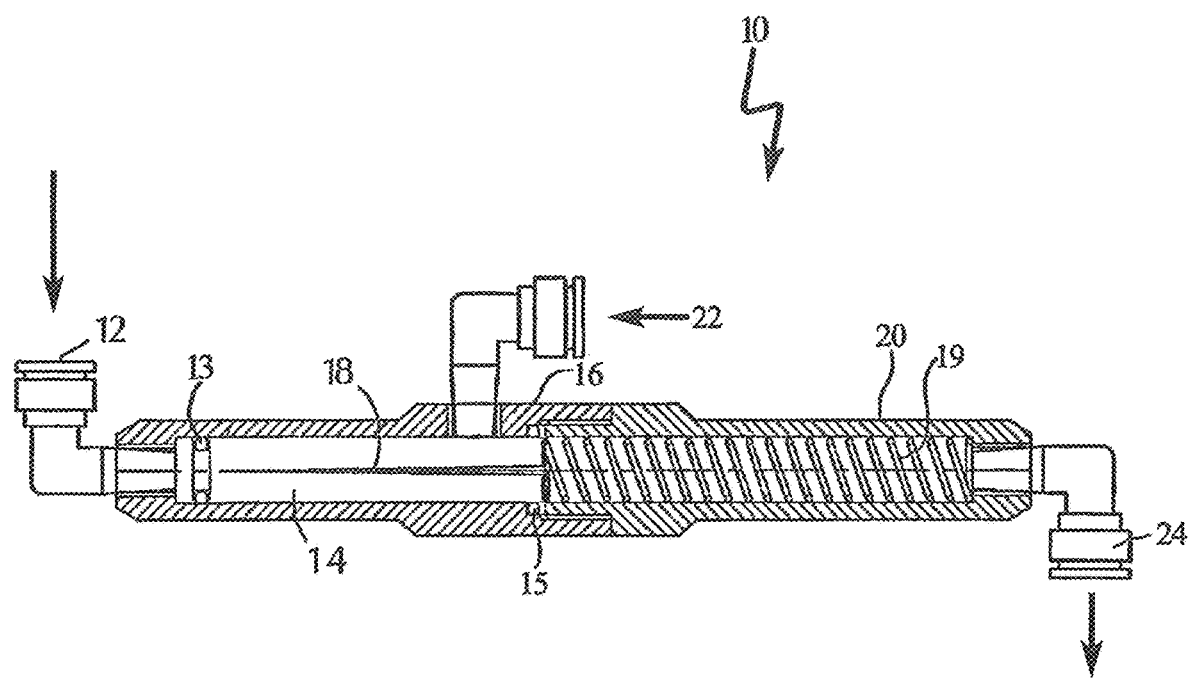
FIG. 1 depicts a proportioning valve of the prior art.
Figure 2A:
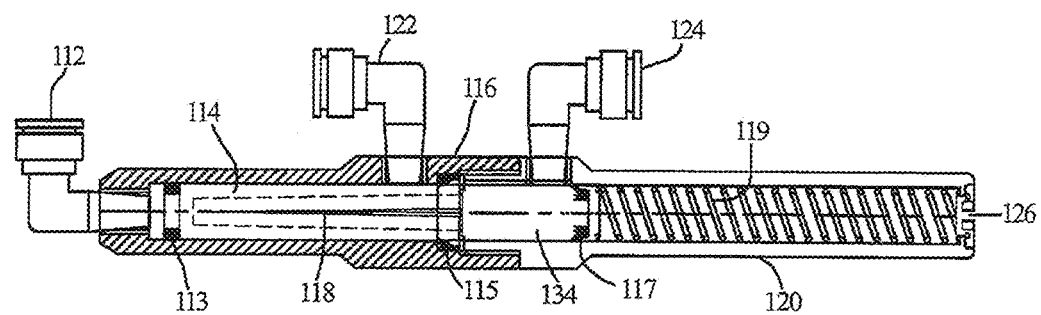
FIG. 2A depicts a first embodiment of a proportioning valve of the present invention having an air vent.

FIG. 2 depicts a first embodiment of a proportioning valve 100 of the present invention. In this embodiment, fluid, such as reject water in a reverse osmosis system, is redirected away from the proportioning valve internal mechanical components that establish the reverse pressure in the valve to counter the incoming tank water pressure. That is, by design a portion of the proportioning reverse pressure mechanism components remain dry and free from exposure to the reject water. Unlike the prior art, the reject water egress port is not placed downstream of the internal mechanical components that establish the reverse pressure in the valve. Pressure tank water inlet 112 is located in a similar manner as depicted in the prior art, shown here with an elbow fitting to the receiving end of the cylindrical housing of proportional valve 100. Although an elbow fitting is depicted, other fittings are envisioned to provide the necessary connection to the RO system.

A slider or piston 114 in proportioning valve 100 includes a slider seal 113, preferably in the form of a wiper seal or other slidably sealing O-ring configuration, disposed on a first end proximate pressure tank water inlet 112, which allows the ingress tank water to provide pressure to slider 114 while sealing the tank water from flowing over the slider, and simultaneously forcing the slider axially towards the center of proportioning valve 100. Slider or piston 114 slides within a cylindrical slider housing 116 against the bias of a reverse pressure component (that is, a component that provides a pressure on the slider in opposite direction to the pressure applied to the slider by the input tank water, such as a spring or other tension forming component 119, which is located in housing. For exemplary purposes, the reverse pressure mechanism shall be described as a spring 119 within a spring housing 120; however, other opposing pressure creating components may be employed with minimal design alteration, while remaining consistent to the teaching of the present invention.

The sliding is performed without the inlet tank water seeping past the slider to the spring housing. A reject water inlet 122 is positioned intermediate the ends of slider housing 116 such that channel 118, which is axially located on the outer surface of slider 114, is in fluid communication with reject water inlet 122, and under certain pressure conditions, simultaneously in fluid communication with reject water outlet 124.

Channel 118 is preferably formed as a V-shaped channel extending about ⅓ to about ⅔ of its length. The V-shaped channel 118 slowly decreases in depth as it moves on piston 114 towards seal 113. Channel 118 is widest and deepest at the end proximate seal 115, and may vary in length and/or width. The "V" of the channel may have an angle of approximately 90 degrees for ease of manufacture; however, the shape of the channel is arbitrarily selected predicated upon the amount of reject water predetermined to traverse the channel and the amount of comparative tension between the bias spring and the reject water tank pressure. Other channel shapes may be implemented, and as noted below, more than one channel may be incorporated on the piston surface.

In proportioning valve systems, as currently envisioned, the valve is designed to shut the system off when the tank pressure reaches approximately two-thirds of the line pressure, although other predetermined limits are possible and adjustable by the length and depth of the channel(s) located on the piston, as well as by an adjustment of reverse pressure exerted by the spring 119.

Reject water outlet 124 is positioned at the end of spring housing 120 adjacent slider housing 116 and reject water inlet 122. Reject water outlet 124 is in fluid communication with reject water inlet 122 via channel 118. When slider 114, forced by tank water pressure (and correspondingly biased by spring 119 in the opposing direction), is positioned so that channel 118 directs fluid from reject water inlet 122 to reject water outlet 124. Unlike the prior art, reject water outlet 124 is not positioned to have reject water flow into the spring housing cavity where the spring resides.

An O-ring seal or wiper seal 115 is located at the end of slider 114 and preferably does not extend beyond reject water outlet 124. An extension piece or cross slider 134 of slider 114 provides a necessary extension of the slider's length to achieve axial displacement of channel 118 without exposing the "dry side" of the proportioning valve to reject water. Cross slider 134 is designed to permit water to flow from channel 118 to reject water outlet 124 while displacing spring 119. Cross slider seal 117 is located at or near the end of cross slider 134 proximate spring 119 in order to form a water-tight seal during axial movement, and block any excess reject water from entering spring housing 120.

Figure 2B:
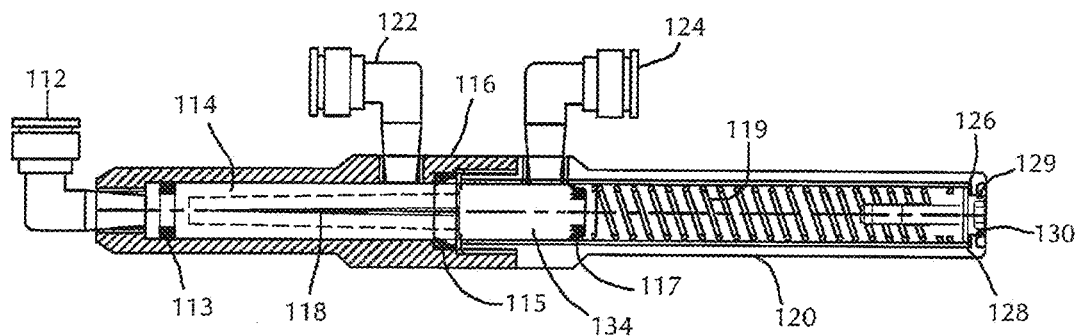
FIG. 2B depicts a proportioning valve of the present invention having a tension adjustment assembly with an adjustable air vent capability.
Figure 3:
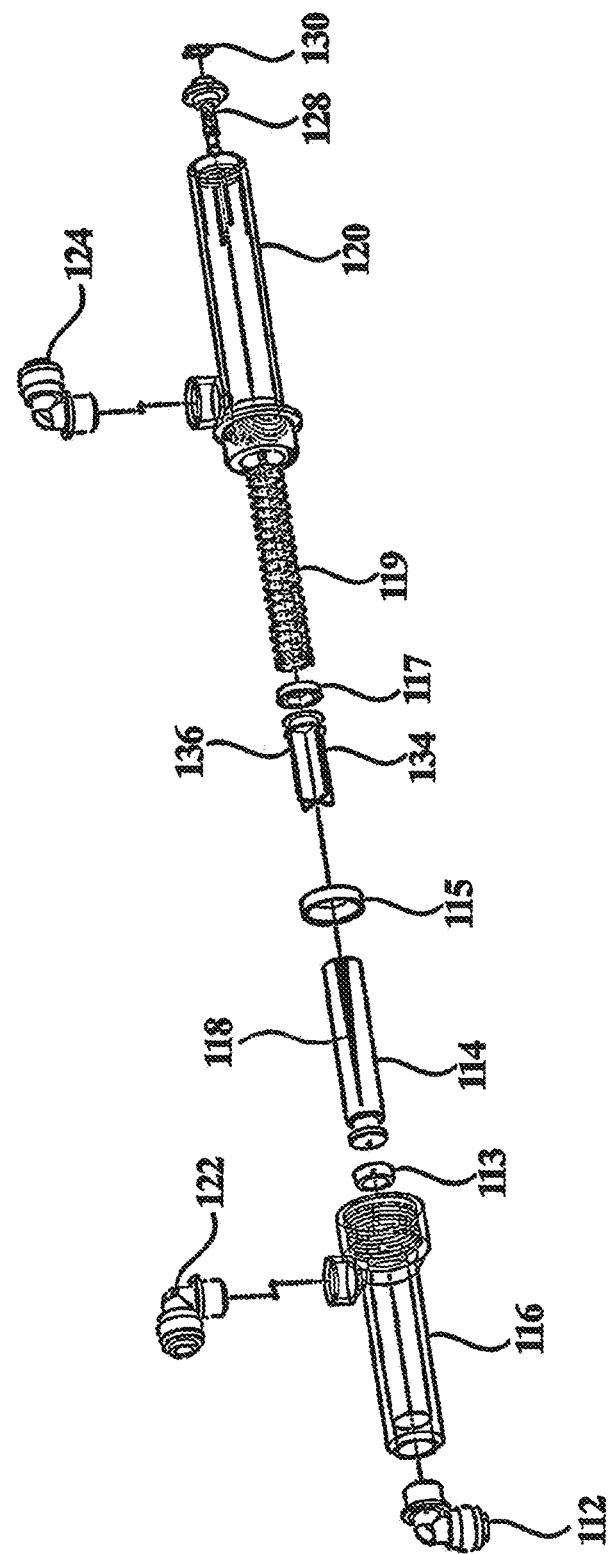
FIG. 3 depicts an exploded view of the proportioning valve of FIG. 2.

FIG. 3 depicts an exploded view of the proportioning valve of FIG. 2. Cross slider 134 is depicted having an X-shaped cross-section for the majority of its body length with predominantly a solid end abutting spring 119 with cross slider seal 117. Cross slider seal 117 is preferably a wiper seal, designed to form a water-tight seal with the internal wall of spring housing 120. Each channel or groove 136 in cross slider 134 is designed to allow water to flow from channel 118 to reject water outlet 124. The grooves 136 formed within cross slider 134 make it possible to receive water from multiple channels 118 in slider 114 and direct this water to reject water outlet 124. Although an X-shaped cross-section is depicted for cross slider 134, other shapes that would allow water flow while providing structural support against the bias force of spring 119 are not excluded and may be employed as a slider extension. Having a plurality of grooves 136 in cross slider 134 provides multiple avenues for water flow from channel 118 to reject water outlet 124, and reduces the weight of the slider extension, while maintaining structural integrity.

When piston 114 is acted upon by tank water pressure, cross slider 134 slides along slider housing 116 and grooves 136 are exposed to the egress port of reject water outlet 124 enabling water to flow from reject water inlet 122 to reject water outlet 124. Cross slider seal 117 is located approximately at the junction of cross slider 134 and spring 119, and may be attached to either cross slider 134 or at the end of spring 119, or both.

In order to ensure that reject water does not flow into the spring housing 120 where spring 119 is located, cross slider seal 117 slidably engages the inner cavity of spring housing 120 in a fluid-tight manner. The presence of cross slider seal 117 on the end of slider or piston 114 or alternatively on the end of spring 119 ensures that water does not enter the spring chamber where spring 119 is located. Additionally, from a manufacturability stand-point, the introduction of wiper seals accommodates variation in the annular space of the slider housing and spring housing cavities, which may result from draft in molded plastic fabrication.

During operation of proportioning valve 100, under tank pressure that exceeds the bias force of spring 119, reject water flows through channel 118 into grooves 136 of cross slider 134. Grooves 136 are exposed to, and in fluid communication with, reject water outlet 124, which permits reject water ingress to exit the proportioning valve via grooves 136 to the reject water outlet 124.

An air vent 126 is introduced to allow the slider to move axially along the spring housing cavity without undue opposing air pressure that could otherwise adversely affect the differential pressure necessary to react properly to the reject water flow. In one embodiment, the air vent may simply be a hole located through spring housing 120. Since the introduction of wiper seals removes the possibility of reject water entering the spring housing 120, an air vent in the spring housing does not pose a leakage concern. Alternatively, the air vent may be formed in combination with a spring tension adjustable assembly explained herein.

An embodiment having a tension adjustment assembly with an adjustable air vent capability is depicted in FIG. 2B. In this embodiment, the air vent circumferentially surrounds an adjustable component 128, such as for example a set screw, which upon rotation provides adjustment to the spring tension. This adjustment allows for the introduction of different types of springs (different lengths, spring force, spring constants, etc.), which simplifies part selection during manufacture. The adjustment also allows for predetermined or in-situ adjustment of the spring's bias force against different tank pressures. Adjustable set screw 128 works in conjunction with a securing nut 129 having a center aperture for receiving set screw 128. In this embodiment, the air vent 126 is segmented by ribs 132 about the outer periphery of set screw 128.

Figure 4:
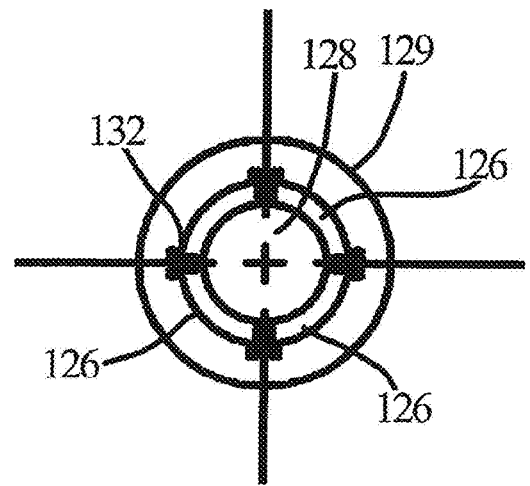
FIG. 4 depicts a cross-sectional view of the end of the proportioning valve of FIG. 2 showing a spring tension adjustment assembly of an adjusting screw located within a nut housing, and forming air vent segments.

FIG. 4 depicts a cross-sectional view of the end of proportioning valve 100 showing the tension adjusting screw 128 located in nut 129, and forming air vent segments 126. The components forming the spring tension adjustment assembly with air ventilation are preferably held in place by a fastener or retaining ring 130, such as a circlip, a C-clip, or snap ring, which preferably is a semi-flexible metal ring with open ends which can be snapped into place, situated in a machined groove to permit rotation but to prevent lateral (axial) movement.

Adjustable component 128, depicted here as a set screw having a turning knob with a threaded portion, maintains tension on spring 119 and allows for a tension adjustment after fabrication, which may be a factory adjustment or a field adjustment. Adjustable component 128 also provides greater flexibility in the spring selection since specific tension can be adjusted, altered, and/or pre-set by knob 128. Adjustable component 128 may also be a slidable resilient disc or other adjustable mechanism for providing adjustable linear (axial) tension to spring 119.

Figure 5:
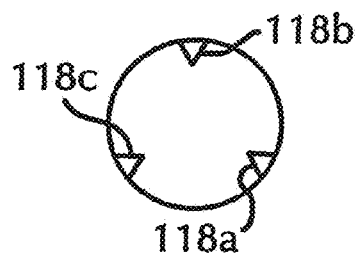
FIG. 5 depicts a slider having a plurality of channels on its outer surface for directing reject water flow.

In at least one embodiment, channel 118 in the piston is V-shaped, semi-circular, square, a flat incline, or other shape having varying width and/or depth and/or length along and inside the surface portion of the slider. Also, unique to the seal placement of the present design, it is possible to include multiple channels 118a-c on the slider as depicted in FIG. 5. The channels may all be alike, or may have different configurations that enable the overall release of reject water in a predetermined fashion having variation not otherwise capable of being duplicated by a single channel.

Figure 6:
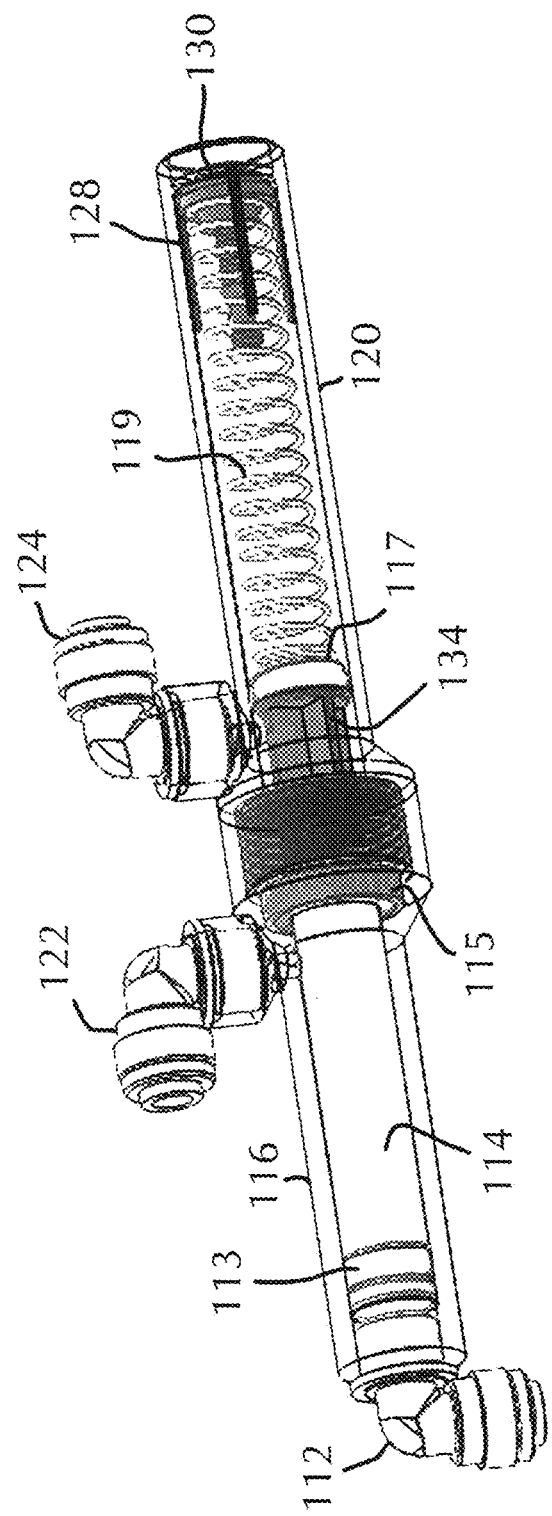
FIG. 6 is an assembled, perspective view of the proportioning valve of FIG. 2.

FIG. 6 is an assembled, perspective view of the proportioning valve 100 of FIG. 2. The proportioning valve is designed to shut off when the tank pressure reaches a predetermined value, such as a predetermined percentage of the line pressure. This eliminates the diminishing returns of product water in relation to constant waste water flow. The proportioning valve operation is governed by the input tank pressure, insomuch as the valve is designed to be responsive to varying tank pressure.

Figure 7:
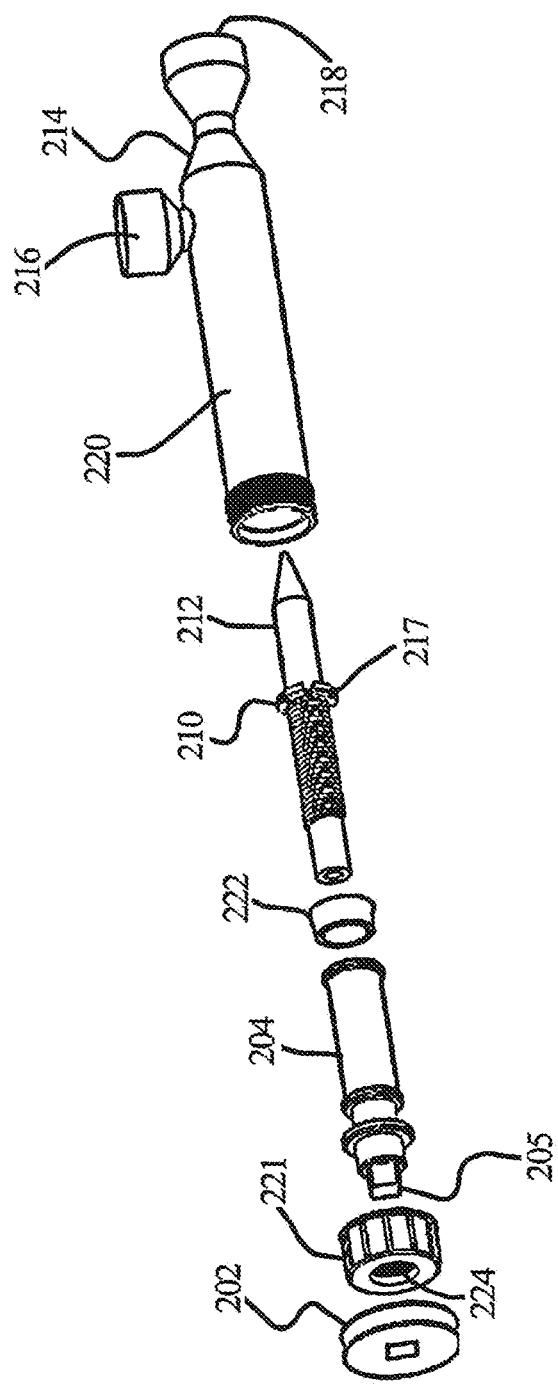
FIG. 7 depicts an exploded view of another embodiment of the present invention, where the spring tension mechanical components and the spring housing are removed and replaced by an alternate mechanism.

FIG. 7 depicts an exploded view of another embodiment of the present invention. In the first embodiment, a cross slider 134 having a cross slider seal 117 keeps reject water from entering the spring housing cavity, and redirect the reject water to the reject water egress port 124 via a channel 118 in piston or slider 114. In this alternative embodiment, the spring, spring housing, as well as the input tank water necessary to create the pressure for moving the slider, are eliminated.

A needle valve assembly is introduced to regulate or restrict the flow of the reject water to drain, predicated on an adjustable actuating assembly responsive to the tank water pressure. Preferably, the actuating assembly is responsive to tank water pressure via pressure sensor input, or to water pressure in a pressurized or unpressurized storage tank (for example, but not limited to, a countertop configuration), or to water weight in a pressurized or unpressurized storage tank, or to conductivity or flow rate of the reject water. The adjustable assembly may be motorized, electrical impulse driven, or a non-electrical drive-driven gear assembly. Unlike the first embodiment or the prior art, a spindle drive 204 in mechanical, rotational communication with a spindle 210 form the components that effect restricted water flow. Spindle 210 includes a cone-shaped, needle end portion 212, which together with a complementary shape of the proportioning valve housing or a complementary shaped component placed within the housing, is utilized as part of the needle valve assembly that serves to restrict flow based on its proximity to the complementary housing portion and the size of the orifice it creates.

Figure 8:
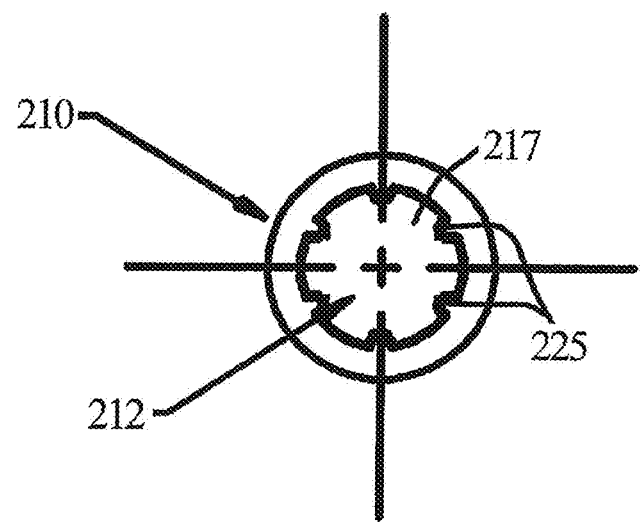
FIG. 8 depicts a cross-section of the housing of FIG. 7, depicting slots in a spindle flange of a needle valve.

This embodiment does not require a slidable piston, nor does it require a formed channel within the outer surface of a slider or piston to restrict the water flow. In FIG. 7, proportioning valve 200 includes an adjustable component 202, such as a knob or worm wheel, which is responsive to a rotary mechanism (not shown) to provide in-situ adjustment to the (threaded) spindle drive 204, which in turn translates the rotational motion into axial movement of spindle 210 and needle end portion 212 against internal wall 214 of the proportioning valve housing that is a complementary cone-shaped enclosure. Spindle 210 is threadably inserted within a complementary threaded cavity of spindle drive 204, such that when spindle drive 204 is rotated, the threads on the spindle drive internal wall and the threads on the outer surface of spindle 210 rotatably engage, which drives spindle 210 either axially away from, or towards, internal wall 214 (depending upon the direction of rotation). Spindle 210 includes intermediate flange 217 that aids in centering spindle 210 within housing 220. In at least one embodiment, intermediate flange 217 circumferentially surrounds spindle 210 in a radially segmented fashion, with each radial segment separated by a slot or groove 225 that opens to the inner wall of housing 220. The inner wall of housing 220 includes linear, axial projections 227 that are slidably engaged in slots 225 when spindle 210 axially translates about housing 220. This configuration ensures that needle end portion 212 is centered about cone-shaped internal wall 214, and avoids rotation of spindle 210 during axial translation. The slot/groove configuration of the spindle and internal wall housing may be replaced with another rotation-inhibiting mechanism, and the present invention is not limited to any particular spindle rotation-inhibitor. FIG. 8 depicts a cross-section of housing 220 depicting projections 227 for slots 225 in spindle flange 217.

A seal 222 is situated at the junction of spindle drive 204 and spindle 210 which assists in keeping reject water from entering the spindle drive side of proportioning valve 200. End cap 221 secures spindle drive 204 within the proportioning valve housing 220, while providing an aperture 224 that allows a shaped end segment a square thread or knob 205 for example at the end of spindle drive 204 to exit the housing and be slidably engaged with mechanized worm wheel 202. In this manner, when worm wheel 202 is rotated by a motorized mechanism having a rotation that is responsive to a particular tank pressure, spindle drive 204 rotates and axially displaces spindle 210 because spindle 210 cannot rotate due to the engagement of grooves or slots 225 on flange 217 with axial projections 227 on the inner housing wall. The axial movement of spindle 210 moves needle end portion 212 closer to, or further from, the cone-shaped internal wall 214, thus varying the size of the orifice created by needle end portion 212 and internal wall 214 of the proportioning valve housing that is a complementary cone-shaped enclosure, thereby regulating reject water flow from reject water inlet 216 to reject water outlet 218.

Figure 9:
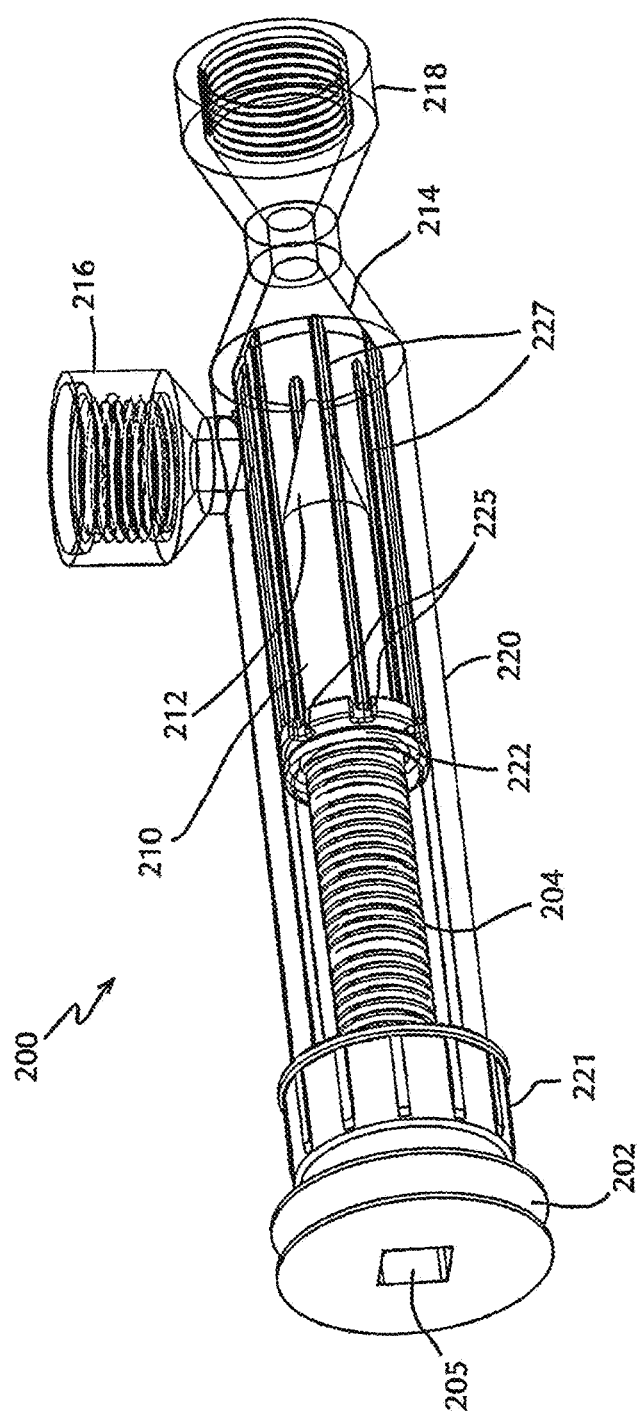
FIG. 9 is a perspective view of the proportioning valve incorporating a needle valve (absent a spring tension mechanism), where the needle valve forms a narrowing annular ring with the cone-shaped internal wall of the housing to restrict water flow during operation.

FIG. 9 is a perspective view of proportioning valve 200. Needle valve 212 forms a narrowing annular ring with cone-shaped segment 214 to restrict flow during operation. Axial projections 227 are depicted on the inner housing wall and align with grooves 225 on flange 217.

Figure 10:
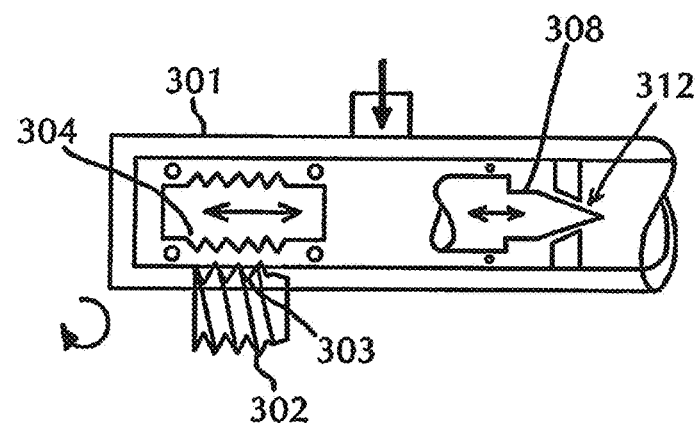
FIG. 10 is a partial schematic cross-sectional view of a variation on the motorized proportioning valve of FIG. 7.

FIG. 10 is a partial schematic cross-sectional view of a variation on the motorized proportioning valve of FIG. 7. In this embodiment, a worm-drive motor 302 actuates a worm-drive 304 within proportioning valve housing 301. A spindle drive (not shown) and spindle 308 (partially shown) would be similar to the design of FIG. 7, or alternatively, only an externally threaded spindle would be needed to engage and interact with the worm-drive motor threads 303. A sensor, such as a pressure transducer, senses the tank pressure status and actuates the worm-drive motor 302 to open or close the orifice of the needle valve in a similar fashion as the embodiment depicted in FIG. 7. Alternatively, a paddle wheel could actuate and drive the gears. It may also be possible for the paddle wheel to monitor flow with proper feedback to a central processing unit.

Figure 11:
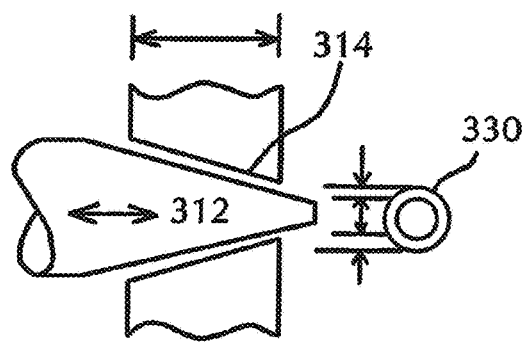
FIG. 11 depicts a side cross-section of the needle end portion of a needle valve with the internal wall of the cone-shaped housing, and a forward cross-section depicting the annular egress port formed when needle end portion enters the cone-shaped internal wall.

FIG. 11 depicts a cross-section of the needle end portion 312 with the internal wall 314 of the cone-shaped housing. An orifice or annular egress port 330 is formed when needle end portion 312 enters cone-shaped internal wall 314, as shown in the expanded view. This cross-section is the same type of cross-section employed by the needle valve of the embodiment of FIG. 7 as well.

Figure 12B:
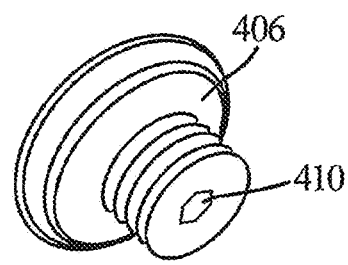
FIG. 12B depicts a schematic isometric view of the spring stop of FIG. 12A, showing an opening for receiving the driver key.
Figure 12A:
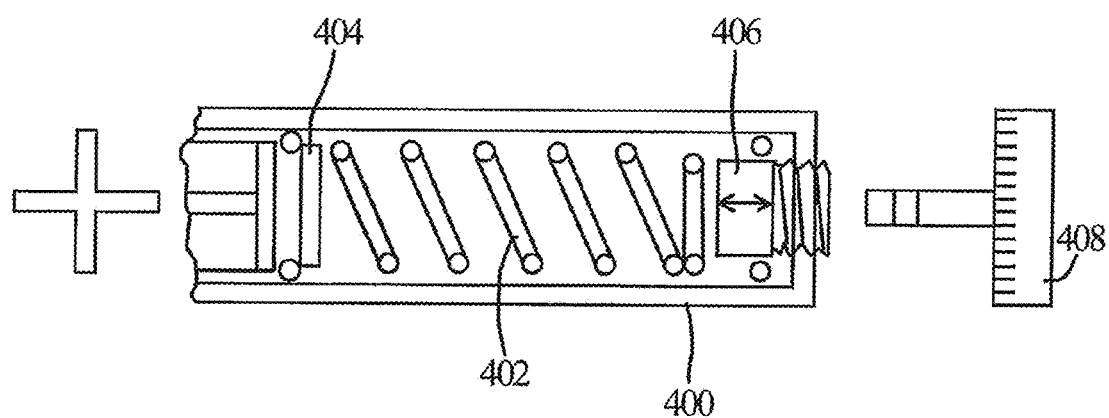
FIG. 12A depicts a schematic cross-sectional view of a partial proportioning valve housing having an enhanced set screw configuration for adjusting spring tension in the embodiments that employ a spring.

FIG. 12A depicts a schematic cross-sectional view of a partial proportioning valve housing having an enhanced set screw configuration for adjusting spring tension in the embodiments that employ a spring. As depicted, partial housing 400 is shown with spring 402 between a spring isolator disc 404 at one end and a spring stop 406 at the other end. The position of spring stop 406 is set using a removable key or driver 408. In this manner, spring tension may be predetermined in a factory set fixture, or in the field by a specialist having the appropriate driver. In-field adjustment mitigates spring/system variation and facilitates functionality and consistency. The drive key/spring stop interface may be any shape that allows for adjustment only when the specified drive key is engaged in the spring stop.

FIG. 12B depicts a schematic isometric view of spring stop 406, showing an opening 410 for receiving driver 408. Opening 410 and complementary driver key 408 may be any predetermined geometric shape or other keying mechanism that allows for mating and simultaneously facilitates rotation.

The proportioning valve of the present invention is designed to be added to a residential reverse osmosis drinking water system, and specifically a residential reverse osmosis drinking water system that utilizes varying accumulated pressure in a storage tank as the energy to modulate the waste water flow in proportion to the product water flow.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. A proportioning valve for a reverse osmosis system comprising:
    a housing having an internal cavity with a reject water inlet proximate one end of said housing;
    a reject water outlet downstream of said reject water inlet, and in fluid communication with said reject water inlet for at least a portion of the operation of said valve;
    a needle valve assembly for restricting flow of water from said reject water inlet to said reject water outlet, said needle valve assembly comprising a non-rotatable spindle having a shaped portion at one end, and a rotatable spindle drive, said needle valve assembly controlled by an adjustable actuating assembly responsive to tank water pressure via a water pressure sensor input, or responsive to water pressure in a pressurized or unpressurized storage tank;
    wherein said spindle is threadably inserted within a complementary threaded cavity of said spindle drive, such that when said spindle drive is rotated, threads on said spindle drive and the threads on an outer surface of said spindle rotatably engage, which drives said non-rotatable spindle in an axial direction.

2. The proportioning valve of claim 1 wherein said spindle in communication with an actuating assembly, wherein said actuating assembly is responsive to said tank water pressure via a water pressure sensor input, or responsive to water pressure in a pressurized or unpressurized storage tank, such that movement of said actuating assembly causes axial translation of said spindle and said shaped end portion of said spindle to form an orifice with a complementary shaped portion of said internal housing or a complementary shaped component within said internal housing to restrict water flow when said spindle is axially, moving said spindle toward said complementary housing or said shaped component.

3. The proportioning valve of claim 2 wherein said spindle shaped end portion is cone-shaped, and said complementary shaped portion of said internal housing is cone-shaped, or said complementary shaped component is cone-shaped.

4. The proportioning valve of claim 1 wherein said needle valve assembly includes:
    said spindle having said shaped end portion at one end and a threaded portion at the opposite end, said shaped end portion of said spindle forming an orifice with a complementary shaped portion of said internal housing or a complementary shaped component within said internal housing; wherein said spindle drive is in rotational communication with said spindle, such that when said spindle drive is rotated, said threaded cavity of said spindle drive engages said threaded portion of said spindle, which drives said spindle either axially away from, or towards said complementary housing or said complementary shaped component, to restrict water flow when said spindle is moved toward said complementary housing or said complementary shaped component.

5. The proportioning valve of claim 4 including a motorized assembly responsive to a sensor such that engagement of said motorized assembly with said spindle drive causes axial translation of said spindle such that said shaped end portion of said spindle forms an orifice with said complementary shaped portion of said internal housing or said complementary shaped component within said internal housing.

6. The proportioning valve of claim 2 wherein said spindle includes a flange having at least one slot or groove, and said housing internal cavity having at least one complementary axial projection for receiving said at least one slot or groove to prohibit said spindle from rotating when said spindle is engaged by said actuating assembly.

7. The proportioning valve of claim 3 including a seal situated proximate a junction of said spindle drive and said spindle, said seal assists in keeping reject water from entering the spindle drive side of said proportioning valve.

8. The proportioning valve of claim 5 including an end cap for securing said spindle drive within said housing, said end cap having an aperture for receiving a shaped end protrusion of an adjacent end of said spindle drive, said protrusion exiting said housing and said end cap, and slidably engaged with a mechanized worm wheel, such that when said worm wheel is rotated at a rotation that is responsive to a particular tank pressure, said spindle drive rotates and axially displaces said spindle.

9. The proportioning valve of claim 1 wherein said spindle is in communication with an actuating assembly, wherein said actuating assembly includes an electrical impulse driven motorized assembly or a non-electrical drive-driven gear assembly, and is responsive to said sensor, said sensor sensing tank water pressure, water level in a pressurized or unpressurized storage tank, conductivity, or flow rate of said reject water, or any combination thereof, such that movement of said actuating assembly causes axial translation of said spindle which moves said shaped end portion of said spindle towards a complementary shaped portion of said internal housing or a complementary shaped component within said internal housing to form a restricting orifice that restricts water flow.

10. The proportioning valve of claim 1 wherein said sensor senses tank water pressure, water level in a pressurized or unpressurized storage tank, conductivity, or flow rate of said reject water, or any combination thereof, in said reverse osmosis system.

11. The proportioning valve of claim 2 wherein said spindle includes a threaded portion opposite said shaped end portion, said threaded portion in rotational communication with an actuating assembly, wherein said actuating assembly is responsive to said sensor such that movement of said actuating assembly causes axial and/or radial translation of said spindle and said shaped end portion of said spindle to form an orifice with a complementary shaped portion of said internal housing or a complementary shaped component within said internal housing to restrict water flow when said spindle is axially and/or radially translated, moving said spindle toward said complementary housing or said shaped component.

12. The proportioning valve of claim 1, wherein the proportioning valve is configured to be added to a residential reverse osmosis drinking water system that modulates the waste water flow in proportion to the product water flow based on input from said sensor.

* * * * *